Feb. 23, 1965 J. L. HENSLEY 3,170,352
GUARD FOR MACHINE TOOLS
Original Filed Jan. 23, 1958 5 Sheets-Sheet 1

INVENTOR
James L. Hensley
BY
ATTORNEYS

INVENTOR
James L. Hensley
BY
ATTORNEYS

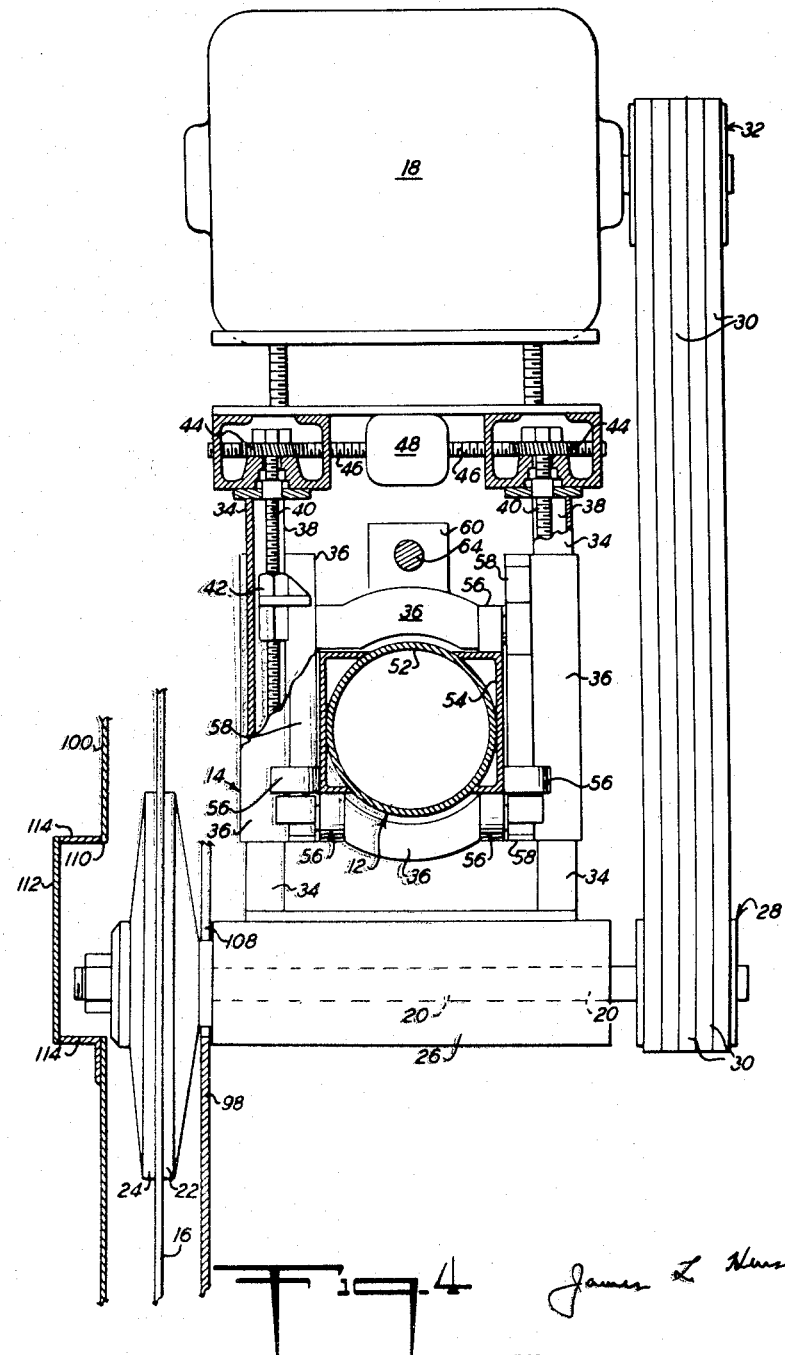

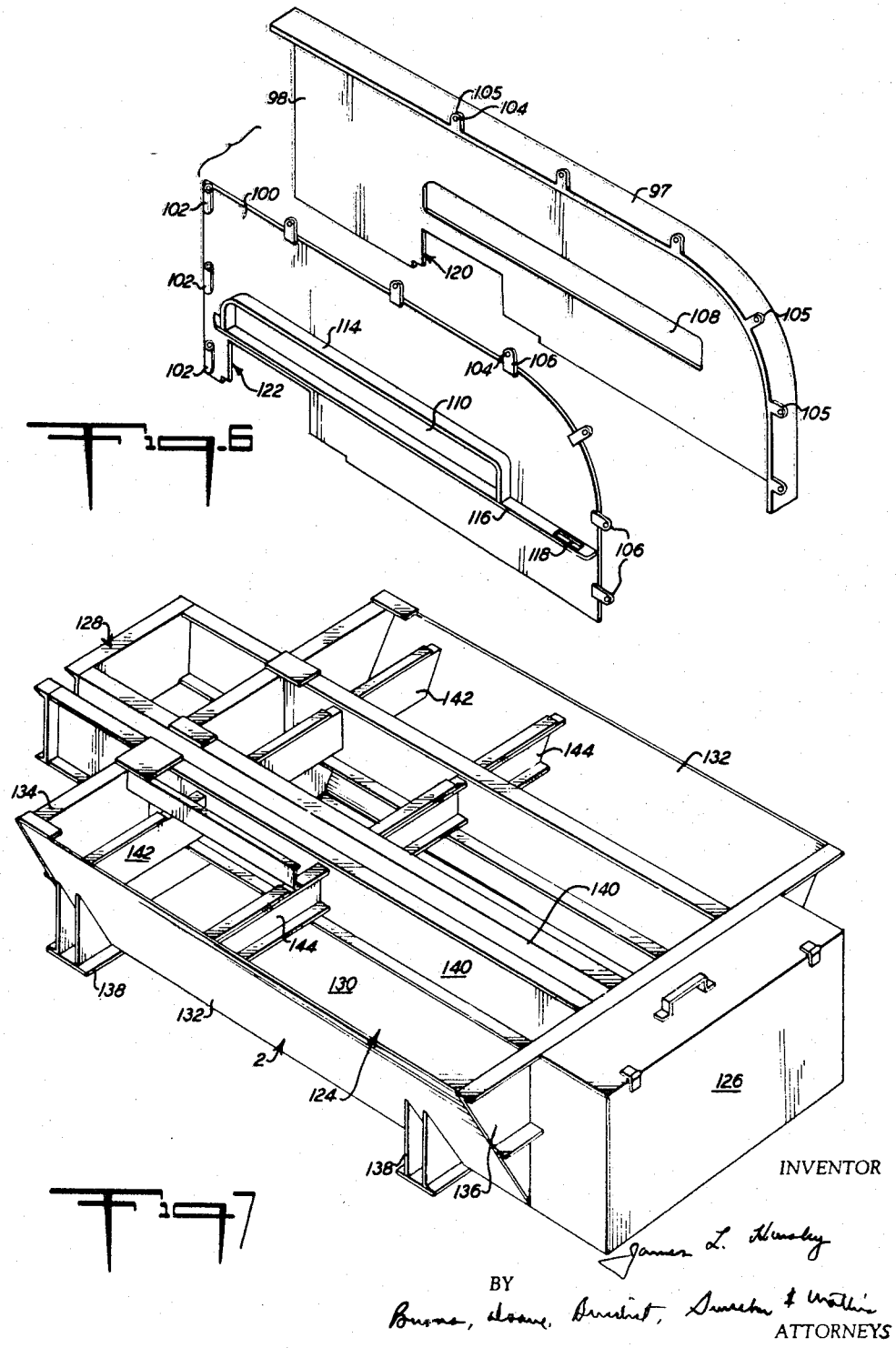

Feb. 23, 1965   J. L. HENSLEY   3,170,352
GUARD FOR MACHINE TOOLS
Original Filed Jan. 23, 1958   5 Sheets-Sheet 5
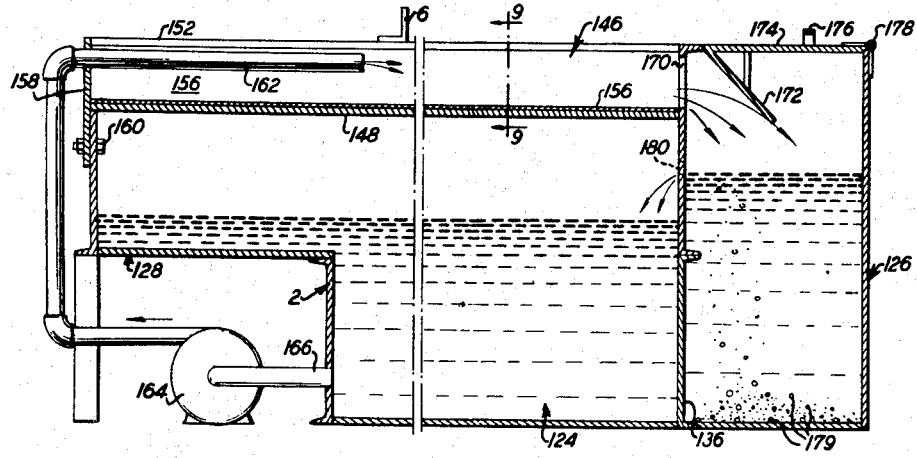
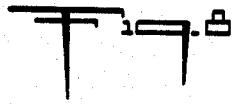
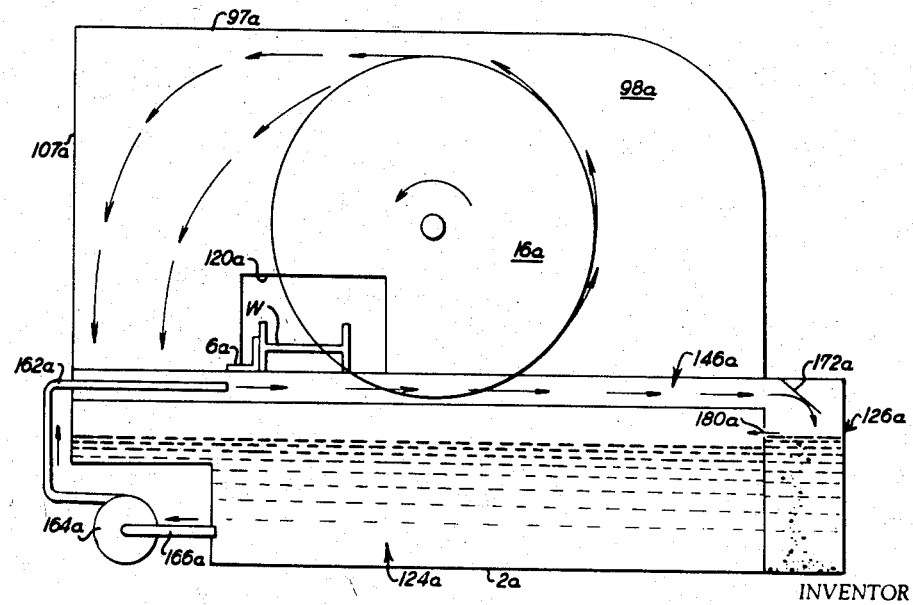
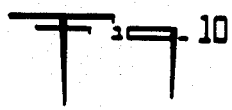
INVENTOR
James L. Hensley
BY
ATTORNEYS United States Patent Office 3,170,352
Patented Feb. 23, 1965

3,170,352
GUARD FOR MACHINE TOOLS
James L. Hensley, Clinton, Tenn., assignor, by mesne assignments, to Tysaman Machine Company, Inc., Knoxville, Tenn., a corporation of Delaware
Original application Jan. 23, 1958, Ser. No. 710,716, now Patent No. 3,069,950, dated Dec. 25, 1963. Divided and this application Nov. 6, 1959, Ser. No. 851,412
10 Claims. (Cl. 83—168)

This invention relates to machine tools, and more particularly to metal working machines equipped with novel guard means for a rotating blade or wheel.

This application is a division of my copending application Serial No. 710,716, filed on January 23, 1958, now Patent No. 3,069,950 dated December 25, 1963.

Although the invention is applicable to various types of machine tools, it will be convenient to refer specifically in this description to its use in friction saws. With a clear understanding of this embodiment, persons skilled in the art will have no difficulty in applying the principles of the invention to other types of machines.

A friction saw is a machine in which sufficient heat is generated between the peripheral face of a rapidly rotating saw wheel and a metal workpiece to sever the workpiece along the path of movement of the wheel.

The advantages of friction saws for heavy production work in the sawing of structural steel long have been recognized. These saws cut very rapidly, and they may be employed in the sawing of many structural shapes. In spite of these advantages, however, the use of friction saws has been limited. The installations available prior to the present invention were large, expensive ones, and many of them were hazardous to operate.

One of the problems encountered in these machines has been the provision of adequate protection for the operating personnel. This factor is of great psychological, as well as functional, importance, because an operator cannot be expected to work effectively with a machine that frightens him. It must be remembered in this connection that the wheel of a friction saw rotates at extremely high speeds, and that the wheel moves rapidly through the work being cut. In such circumstances, the wheel is subjected to tremendous loads tending to shatter it. When a wheel does shatter, the pieces fly off like bullets in all directions. There is danger also in the fact that particles of the work being cut tend to be thrown off from the cutting zone with great force.

In the prior machines, the means provided for protecting the operator against injury were so ineffective that, in many instances, it was necessary to provide for remote control of the machines. The operator of such an installation would set up the machine for a cutting operation, retreat to a remote control station, operate the machine from the remote station, and then return to the machine after the cutting operation had been completed. This awkward procedure results in much lost time. Moreover, the use of the remote control station increases both the expense of and the space requirements for an installation, and additionally has an adverse effect upon the quality of the work performed.

Another troublesome problem in the construction of cut off machines has been the provision of means for effectively confining the metal particles removed from the work so that they might be collected conveniently for periodic removal from the work area. The presence of waste in the work area presents safety problems and also lowers the operating efficiency of the personnel.

It is an object of this invention to overcome the objections and disadvantages noted above and to provide a truly safe machine tool which may be operated efficiently under service conditions.

Another object of this invention is to provide a friction saw of unit construction, which will obviate the necessity for remote control stations.

Another object of this invention is to provide a cut off tool with means for effectively protecting the operating personnel in the vicinity of the machine.

Another object of this invention is to provide a friction saw with a wheel guard so located with respect to the cutting wheel and the work as to direct wheel cooling liquid away from the work.

The foregoing objects may be accomplished according to a preferred embodiment of the invention, by provision of a cut off tool, such as a friction saw, having a base and a rotating saw blade or wheel mounted for bodily movement within a stationary guard secured to the base. The guard is elongated and it has a relatively small slot therein adjacent the upper surface of the base of the machine through which the work may be inserted to bring it into the path of movement of the rotating saw wheel.

The guard completely encloses the blade and affords maximum protection to the operator of the machine. It also serves to minimize the noise emitted during cutting runs and to confine any stray metal particles removed from the work to a limited zone so as to facilitate collection thereof.

The machine is provided with a control station close to the cutting zone. This control station includes heavy metal barrier walls to give the operator adequate protection against injury and to minimize the natural fear element involved in the operation of such equipment. One wall includes a small window of double strength safety glass through which the progress of the cutting operation may be observed by the operator.

A more complete understanding of the invention will be gained from a consideration of the following detailed description of an embodiment thereof illustrated in the accompanying drawings, in which:

FIG. 4 is a vertical cross sectional view taken along the line 4—4 in FIG. 3, with certain of the parts being broken away;

FIG. 6 is an exploded perspective view of components of the wheel guard of the friction saw;

FIG. 7 is a perspective view of the base of the friction saw;

FIG. 8 is a longitudinal vertical cross sectional view of the base of the saw, illustrating a supply of liquid coolant therein;

FIG. 10 is a flow diagram for the liquid coolant.

Figure 1:
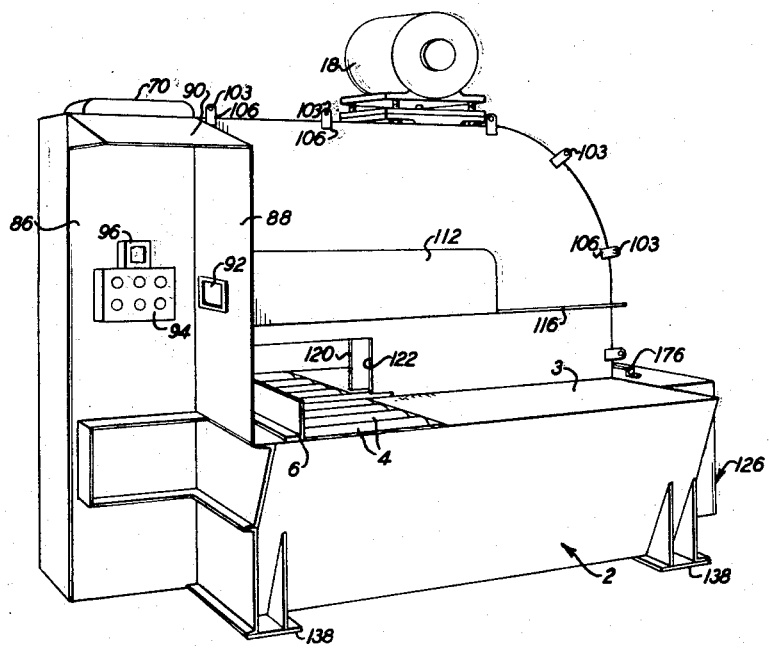
FIG. 1 is a perspective view of a friction saw embodying the present invention.
Figure 2:
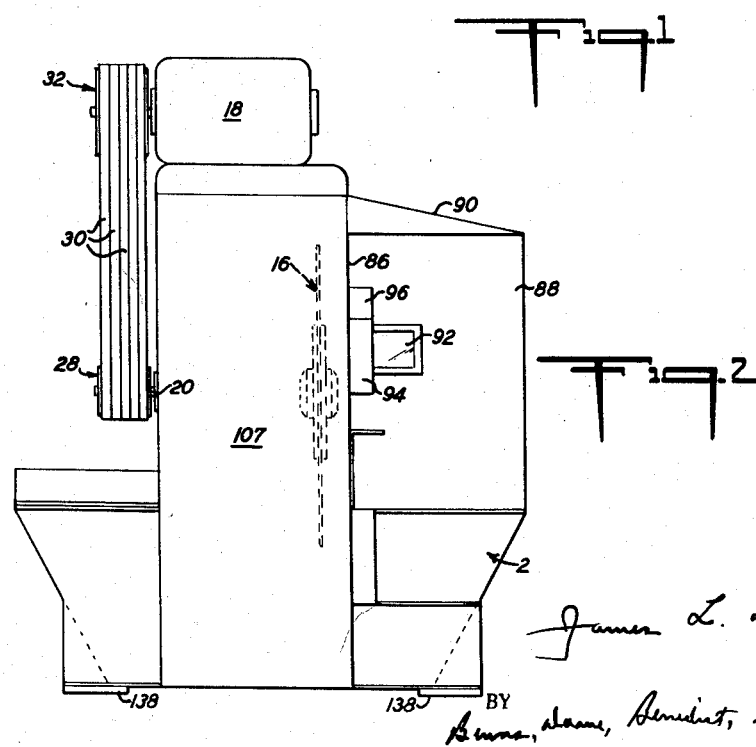
FIG. 2 is an end view of the friction saw shown in FIG. 1.
Figure 3:
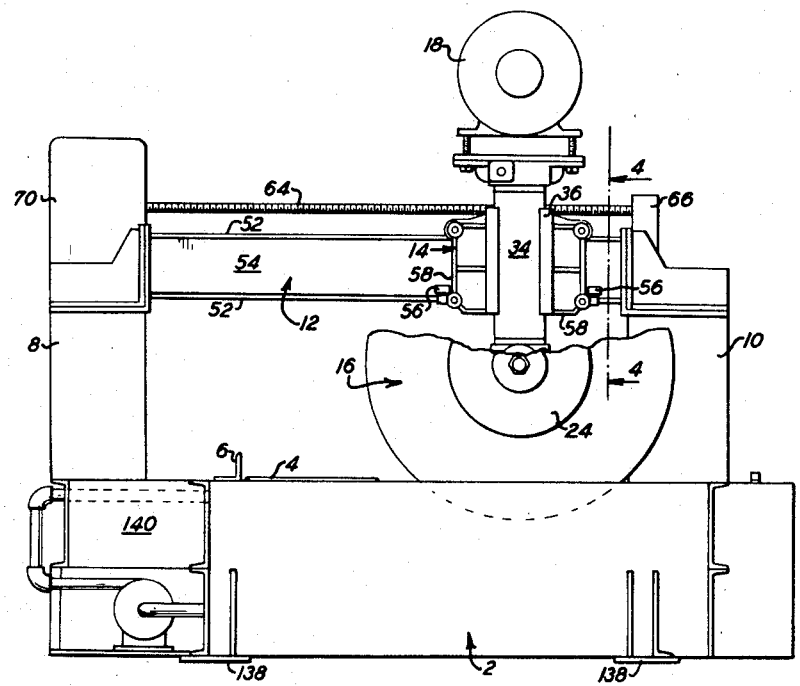
FIG. 3 is a side elevational view of the friction saw, with the wheel guard and certain frame parts being omitted to reveal the interior construction.

An understanding of the general organization of the illustrated friction saw can be gained from a consideration of FIGS. 1, 2 and 3. The machine includes a base 2 provided with a steel grating 3 at its upper end. Also mounted upon the base 2 are a transversely extending series of rollers 4 for supporting the work to be cut and a rigid abutment 6 for positioning the work.

Extending upwardly from the base 2 near its ends are rigid uprights 8 and 10 which carry an overhead rail 12. A carriage 14 is mounted upon the rail 12 for movement longitudinally of the machine, and a saw wheel 16 is mounted upon the carriage 14. An electric motor 18 for rotating the wheel 16 also is mounted upon the carriage 14 so that both the wheel 16 and its drive motor 18 move along the rail 12 with the carriage 14. Thus, when the wheel 16 is rotated by its motor 18 and the carriage 14 is moved to the left in FIGS. 1 and 3, the periphery of the rotating wheel 16 will be brought into frictional engagement with the work (not illustrated) supported upon the rollers 4 to sever the work.

The saw wheel 16 may be of any of the types used heretofore in friction saws. For example, it may be a simple disc, or it may be a swaged-tooth wheel. A plain disc has been illustrated in the drawings in the interest of clarity and simplicity. However, the swaged-tooth wheel is preferred by many users, because normally, it can be expected to produce less burr during the cutting operation. A substantially planar configuration of the wheel 16 has been illustrated in the drawings. This is the configuration assumed by the wheel when it is rotating at high speeds. However, under static conditions, the wheel 16 is dished or bowed. As is well known in the art, this construction results in a desirable stress pattern in the wheel and materially enhances its ability to withstand the loads imposed upon it during use.

Referring particularly to FIGS. 3 and 4 of the drawings, it will be seen that the wheel 16 is mounted upon a horizontally extending arbor 20 by conventional clamping members 22 and 24 so that the wheel 16 rotates with the arbor 20. The arbor 20 is rotatably mounted in suitable bearings disposed within a housing 26, and its opposite end portion has fixed thereto a series of pulleys 28 cooperating with a plurality of V-belts 30 extending from pulleys 32 fixed to the drive shaft of the motor 18.

The housing 26 is supported by a pair of slides 34 extending through vertical slots in the main body 36 of the carriage 14. Each of the slides 34 has a centrally located opening 38 in its rear face for receiving a vertically extending adjustment screw 40 by which the vertical distance between the arbor 20 and the overhead rail 12 of the machine may be regulated when desired. Each of the screws 40 cooperates with a nut member 42 fixed to the main body 36 of the carriage 14, and the upper end of each of the screws 40 carries a worm wheel 44. The two worm wheels 44 cooperate with a single worm 46 driven by a small electric motor 48.

When it is desired to raise the arbor 20 relative to the rail 12 of the machine, the motor 48 may be actuated to drive the adjustment screws 40 in a direction such as to move the slides 34 upwardly relative to the main body 36 of the carriage 14. Then, when it is desired to lower the arbor 20, the motor 48 may be reversed to cause both of the nuts 42 to feed downwardly along the screws 40.

As illustrated, the overhead rail 12 of the machine consists of a tubular member 52 and a pair of channels 54 welded to opposite sides of the tubular member 52. The main body 36 of the carriage 14 is spaced from the rail 12 and is supported thereby through groups of rollers 56 carried by laterally projecting frames 58. The rollers 56 contact the top, bottom, and side faces of the channels 54 and serve to constrain the carriage 14 to axial movements along the rail 12.

Figure 5:
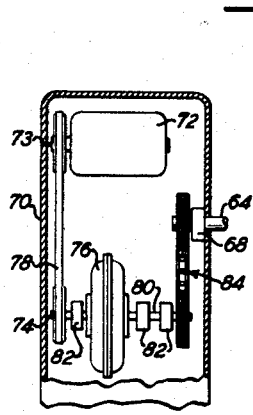
FIG. 5 is a cross sectional view illustrating the feed means for the cutting wheel of the friction saw.

A nut 60 is secured rigidly to the upper portion of the main body 36 of the carriage 14. This nut cooperates with a longitudinally extending screw 64 mounted for rotation in suitable bearings supported by the main uprights 8 and 10 of the machine. The right-hand bearing 66 is illustrated in FIG. 3 of the drawings, and the left-hand bearing 68 is illustrated in FIG. 5. The bearing 68 is disposed within a housing 70 fixed to the upper end of the upright 8. When the screw 64 is rotated in one direction, the carriage 14 will be moved to the left in FIGS. 1 and 3, and when the screw is reversed, the carriage will be moved to the right in FIGS. 1 and 3.

Also enclosed within the housing 70 is a drive system for rotating the screw 68. This system includes a conventional electric motor 72 of a type which will permit reversal of its direction and also will permit regulation of its speed. The drive shaft 73 of the motor 72 is connected to an input shaft 74 of a fluid coupling 76 by means of a suitable V-belt 78. An output shaft 80 is connected to the opposite side of the fluid coupling 76, and the two shafts 74 and 80 are held in alignment by conventional bearing means 82. The output shaft 80 is connected by a chain-and-sprocket coupling 84 to the end of the drive screw 64.

During cutting operations, the rate of advance of the carriage 14 carrying the saw wheel 16 must be carefully regulated. If the carriage is advanced too rapidly, the friction between the periphery of the wheel 16 and the work being cut becomes so large that there is a tendency for the wheel 16 to slow down. In other words, its drive motor 18 becomes overloaded. Should the peripheral speed of the wheel 16 diminish materially however, its heating effect at the cut also will diminish, and the cutting operation cannot proceed efficiently.

The motors 18, 48 and 72 may be controlled from a station at the left end of the machine in FIG. 1. This control station is so constructed as to provide complete protection to the operator of the machine and to permit the operator to observe the progress of the cutting operation. It is formed by heavy barrier plates 86 and 88, and a roof 90.

The barrier 88 extends transversely of the machine from the barrier 86 to the lateral edge of the base 2, at a location just beyond the work-positioning abutment 6. It is provided with a small window 92 of double strength safety glass through which the operator of the machine may observe the work without exposing himself to possible injury.

The back wall of the control station is formed by the barrier plate 86. This wall is rigidly connected to the base 2 of the machine and is spaced forwardly of the adjacent upright 8. A control panel 94 and one or more measuring or indicating instruments 96 may be mounted upon the barrier plate 86 at a convenient level.

The wheel 16 of the friction saw is enclosed within a stationary guard best illustrated in FIG. 6. The top and end walls of the guard are formed by a curved member 97 permanently fixed to a rear wall 98 of the guard. The rear wall 98 is, in turn, secured rigidly to the base 2 of the machine and to the front faces of the uprights 8 and 10. Its length corresponds generally to the distance between the outer extremities of the uprights 8 and 10.

A shorter member 100 forms the main section of the front wall of the guard. It is connected by suitable hinges 102 to the inner edge of the transversely extending barrier plate 88 so that it may be swung open to permit inspection or replacement of the wheel 16. Normally, however, the front wall section 100 of the guard is secured to the top wall 97 thereof by bolts 103 or other suitable fastening means passing through holes 104 in ears 105 and 106 protruding from the adjacent portions of the members 97 and 100, respectively. The movable wall section 100 is of such length that, when the section 100 is open, the wheel 16 will be exposed to view all along the path of movement of the wheel.

The portions of the top wall 97 and the rear wall 98 shown at the left in FIG. 6 extend beyond the end of the front wall 100 into the space between the upright 8 and the barrier plate 86. In this zone, the barrier plate 86 serves as a front wall of the saw wheel passageway, and in this sense, it forms a continuation of the front wall 100 of the guard for the wheel. The left end of the wheel-receiving passageway may be closed in any suitable manner. In the drawings, the main closure plate 107 (FIG. 2) for the left end of the machine serves this function.

The rear wall 98 of the guard is provided with an elongated slot 108 to permit passage of the arbor 20 therethrough. Similarly, the front wall member 100 includes a slot 110 which provides clearance for the outer end of the outer clamping member 24 which secures the wheel 16 to the arbor 20. These slots 108 and 110 permit the wheel 16 to be adjusted vertically and moved longitudinally of the machine in the required manner.

A cover plate 112, shown in FIGS. 1 and 4 but omitted from FIG. 6 in the interest of clarity, normally closes the slot 110 in the member 100. This cover plate 112 is attached to a frame 114 protruding from the front wall member 100, so that it will not interfere with the movement of the clamping member 24 along the slot 110.

Extending laterally from the frame 114 surrounding the slot 110 in the member 100 is a brace member 116 of angular cross section. As illustrated, this member 116 is integral with the frame 114, but it may be a separate element if desired. The frame 114 and the member 116 cooperate to enhance the rigidity of the front wall 100 of the wheel guard. Also, the end of the brace member 116 may be provided with a small opening 118 through which the operator of the machine may insert his fingers when grasping the brace member 116 for the purpose of swinging the front wall 100 about its hinges 102.

The lower edges of the members 98 and 100 are provided with aligned notches 120 and 122, respectively, at locations corresponding to the position of the series of work-supporting rollers 4 carried by the base 2 of the machine. These notches 120 and 122 constitute the only openings in the completed guard structure and they need be no larger than is required for the reception of the work to be cut.

Moreover, it will be observed that, during actual cutting operations, the work itself tends to close the notches 120 and 122. In instances where the work is of the maximum size which can be accommodated by the notches 120 and 122, there is substantially no exposure of the wheel 16. When smaller work is being handled, there is a small amount of exposure of the wheel 16, but the likelihood that a fragment from a shattered wheel might find such a minute opening in the wheel guard is very small. Hence, the construction is a very safe one, and operators of these machines need have no fear of injury.

The base 2 of the machine is illustrated in FIGS. 7 and 8 of the drawings. It is of welded steel construction and is shaped to provide a main reservoir 124 for a liquid coolant, a settling tank 126 at one end of the main reservoir 124, and a centrally located extension 128 at the opposite end of the main reservoir 124. The main reservoir 124 is formed by a bottom wall 130, laterally sloping side walls 132, and vertical end walls 134 and 136. A plurality of feet 138 are fixed to the sloping side walls 132 and depend therefrom to carry the weight of the machine.

The main reservoir 124 is of such size that several hundred gallons of water or other liquid may be stored therein. As will be explained in more detail below, this liquid serves to cool the wheel 16 of the friction saw, and, unless there is a very large quantity available, the temperature will rise to such an extent that the liquid cannot accomplish its intended cooling function.

Extending longitudinally of the base 2 from the outer end of the extension 128 to the end wall 136 of the main reservoir 124 are a pair of large channel members 140 disposed in back-to-back relation. These channels are secured to the end walls 134 and 136, and also are braced and supported by transversely extending members 142 and 144 welded to the side walls 132.

The space between the channel members 140 is in alignment with the path of movement of the saw wheel 16, and the bottom peripheral portion of the wheel 16 extends into this space. Also located within this space is a novel coolant channel for cooperating with the depending peripheral portion of the blade 16. This channel has been omitted from FIG. 7 in the interest of clarity, but it has been illustrated in FIGS. 8 and 9.

Figure 9:
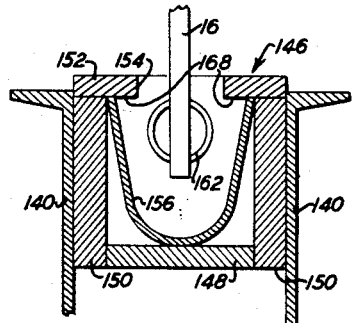
FIG. 9 is a detailed vertical cross sectional view taken along the line 9—9 in FIG. 8.

Referring particularly to FIG. 9, it will be seen that the inner faces of the two channel members 140 serve to support a duct designated generally by the numeral 146. The duct 146 comprises a bottom wall 148, side walls 150, and a top wall 152 welded or otherwise secured together to form a rigid structure of substantial length.

As illustrated, the duct 146 is secured to the inner faces of the channels 140 by welding. It will be understood, however, that the manner of positioning the duct 146 in the space between the channels 140 may be varied without departing from the present invention. For example, the duct may be slidably positioned within the space between the channels 140 and may rest upon wedge means of the type suggested in United States Patent No. 2,772,528, granted to Harry C. Else on December 4, 1956. This type of mounting for the duct 146 has the advantage that the duct 146 may be moved upwardly or downwardly relative to the base 2 of the machine when desired. When the upper face of the top wall 152 of the duct 146 is disposed slightly above the surface of the work-supporting rolls 4, the work cannot fall down after being severed, to bind against the lateral faces of the wheel 16.

The top wall 152 of the duct 146 is provided with a centrally located slot 154 for receiving the bottom peripheral portion of the saw wheel 16. This slot 154 must be of a length at least as great as the length of the path traversed by the lower peripheral portion of the saw wheel 16, and it must be wide enough to accommodate the wheel 16 under static conditions. As mentioned above, the wheel 16 normally will be of dished or bowed configuration under static conditions. Hence, the illustration of the wheel 16 in FIG. 9 is accurate only when it is assumed that the wheel 16 is rotating very rapidly. When the wheel is stationary, its lower peripheral portion will be inclined from the vertical, and the slot 154 must be wide enough to accommodate it under these circumstances also. However, it is preferred that the slot 154 be no wider than is necessary for this purpose.

As the wheel 16 contacts a workpiece, its peripheral face tears from the workpiece small pieces of metal. These pieces are projected downwardly with great force to produce a sand blast effect. In order to prevent abrasion of the bottom wall 148 of the duct 146 under the influence of this blast, the duct 146 is provided with a replaceable metal liner 156.

Referring to FIG. 8, it will be seen that the liner 156 may extend the full length of the duct 146. A removable cover member 158, attached to the end wall of the extension 128 of the base 2 of the machine by bolts 160 or other suitable means, normally closes one end of the duct 146, but it may be removed to permit withdrawal of a liner 156 which has become worn.

A liquid conduit or pipe 162 passes through the cover 158 into the interior of the duct 146. In the preferred form of the invention illustrated in FIGS. 8 and 9, the outlet end of the conduit 162 is located in the upper central portion of the duct 146 in alignment with the path of the saw wheel 16, and it is disposed close to the work-positioning abutment 6 so that water issuing from the outlet end of the conduit 162 will strike against the peripheral face of the saw wheel 16 as the wheel leaves the workpiece to cool and clean the wheel. The pipe 162 is supplied with a high velocity liquid stream by a high pressure pump 164, the intake 166 of which is connected directly to the main reservoir 124 in the base 2 of the machine.

The pump 164 must be selected so that the stream of liquid issuing from the conduit 162 will have the required velocity and volume. As an example, if the conduit 162 is of 1¼ inch diameter, the pump 164 may be a 70 gallon per minute pump working at 150 p.s.i. Under these conditions, the jet of coolant issuing from the conduit 162 produces a very effective cleaning and cooling action upon the wheel 16.

The direction of the liquid stream against the peripheral face of the wheel 16, rather than against the sides of the wheel 16, is particularly important. Efficiency in cleaning and cooling can be attained only when very large volumes of liquid are brought into contact with the working face of the wheel 16, and if the stream of liquid were directed against the sides of the wheel, the resistance to flow would be so large as to prevent the maintenance of high volume conditions within the liquid stream.

Referring particularly to FIG. 9, it will be seen that the replaceable liner 156 in the duct 146 has sloping sides and that its upper ends are disposed in contact with the top wall 152 of the duct 146 at points spaced laterally from the slot 154 in the top wall 152. The sloping sides of the liner 156 are advantageous in that they tend to confine the liquid in the channel to the surfaces of the wheel 16 so that the cooling action produced by the liquid is enhanced materially. There is a tendency for the liquid to move upwardly along the sloping sides of the liner 156. This tendency is rendered harmless, however, by the overhanging lips 168 formed by the portions of the top wall 152 which extend horizontally from the upper edges of the liner 156 toward the path of the wheel 16. Nearly all of the liquid is deflected downwardly and inwardly by these lips 168, so that very little of it escapes through the slot 154, and so that it is returned to the surface of the wheel 16.

The discharge end of the duct 146 is open. It communicates with an opening 170 in the vertical wall 136 which separates the main reservoir 124 from the settling tank 126. The liquid coolant and particles of metal thrown off from the wheel 16 pass through the opening 170 into contact with an inclined baffle 172 fixed rigidly to a lid or closure 174 on the settling tank 126. The lid 174 is provided with a suitable handle 176, and it is connected to the end wall of the settling tank 126 by means of hinges 178. This arrangement permits the lid 174 to be swung open when desired, to allow access to the interior of the settling tank 126, and to facilitate replacement of the baffle 172 should the baffle become worn during use by reason of the repeated impacts thereagainst of small particles of metal carried along at high velocities by the stream of liquid coolant.

The metal particles 179 have substantially greater densities than the liquid, so that these particles tend to collect at the bottom of the settling tank 126. The liquid level rises unil it reaches one or more openings 180 in the vertical wall 136 separating the main reservoir 124 from the settling tank 126. Then the liquid is free to move through the openings 180 into the main reservoir 124.

A better understanding of the complete liquid cooling system can be gained from a consideration of the flow diagram in FIG. 10 of the drawings. In this view, it is contemplated that the saw is acting upon a workpiece W in the shape of an I-beam. The reference characters employed in FIG. 10 include the letter "a" preceded by numerals which correspond to the reference numerals applied in other views to structural components which carry out the functions suggested in FIG. 10.

The saw wheel 16a rotates rapidly in a counterclockwise direction. The friction generated between the peripheral face of the wheeel 16a and the work W is sufficient to heat the work to a red heat. When the work W is softened in this maner at the point of contact with the wheel 16a, the wheel pulls out particles of the softened material very rapidly and the depth of the cut progressively increases.

The extremely high speed of the cutting wheel 16a causes a film or skin of air to move with the wheel. However, as the wheel 16a enters the cut, the work W itself becomes a very close fitting baffle blocking further movement of the adhering air film. Immediately after the periphery of the wheel 16a emerges from the bottom of the work W, it passes into the narrow slot in the upper end of the duct 146a, which, as explained above, is as narrow as the dished shape of the wheel 16a will permit. Hence, the air film surrounding the wheel 16a is substantially prevented from entering the duct 146a.

When the peripheral face of the wheel 16a enters the duct 146a, it is immediately contacted by a high velocity stream of liquid projected from the pipe 162a by the pump 164a connected by a small pipe 166a to the main reservoir 124a in the base 2a of the machine. The stream of liquid not only cools the periphery of the wheel 16a but also removes metal particles from it.

After contacting the wheel 16a, nearly all of the liquid continues to move along the duct 146a, carrying with it the particles of metal removed from the wheel 16a. At the discharge end of the duct 146a, the stream of liquid and metal particles strikes the inclined baffle 172a in the settling tank 124a and is deflected downwardly into the main body of the settling tank. The metal particles gravitate to the bottom of the tank 124a, and clear liquid rises to the level of the openings 180a through which it moves back to the main reservoir 124a to be again circulated by the pump 164a.

Any stray metal particles that do not find their way into the liquid stream will be retained within the stationary guard structure for periodic collection and removal.

Since the liquid content is applied to the wheel 16a beneath the work W, there is very little chance that any of the liquid will be carried completely around the circumference of the wheel 16a to the top of the work W being cut. Small amounts of liquid do adhere to the wheel 16a, but these are thrown off by centrifugal force prior to contact of the wheel 16a with the work W.

In this connection, it will be observed that the top and end walls 97a and 107a of the wheel guard extend well to the left of the work-receiving opening in the rear wall 98a of the guard. Hence, the small amounts of liquid thrown from the wheel 16a against the inside walls of the wheel guard are carried out and down at a location which is remote from the work W being cut. The work W is substantially free from contact with the liquid cooling medium, and the cooling of the wheel 16a in no way interferes with the heating of the work W.

Although a single embodiment of the invention has been illustrated and described in detail, various modifications and alterations will be apparent to persons skilled in the art. It is intended, therefore, that the foregoing description be considered as exemplary only, and that the scope of this invention be ascertained from the following claims.

I claim:

1. In a cut off tool having a base, an arbor mounted for rotation about a horizontal axis disposed above said base, a cutting wheel on one end of said arbor, means for rotating said wheel about said axis, means for moving the rotating wheel bodily along a horizontal path at right angles to its axis of rotation, and means for positioning work to be cut on the top of said base in the path of said wheel, the improvement which comprises a stationary wheel guard including a rear wall extending upwardly from said base on one side of the path of said wheel and having an elongated slot therein for receiving said arbor, a front wall extending upwardly from said base on the opposite side of said wheel, said front and rear walls being provided with aligned openings therein through which the work to be cut may extend across the path of the wheel, a top wall extending between said front and rear walls above said wheel, and end walls extending between said front and rear walls at points spaced from the ends of the path of said wheel a substantial distance to form enclosed areas remote from the workpiece holding area to receive any foreign matter thrown from the cutting wheel.

2. In a cut off tool having a base, an arbor mounted for rotation about a horizontal axis disposed above said base, a cutting wheel on one end of said arbor, means for rotating said wheel about said axis, means for moving the rotating wheel bodily along a horizontal path at right angles to its axis of rotation, and means for positioning work to be cut on the top of said base in the path of said wheel, the improvement which comprises a stationary wheel guard including a rear wall extending upwardly from said base on one side of the path of said wheel and having an elongated slot therein for receiving said arbor, a front wall extending upwardly from said base on the opposite side of said wheel and including a pivotally mounted section which may be swung away from said rear wall to permit inspection and replacement of said wheel, said front and rear walls being provided with aligned openings therein through which the work to be cut away may extend across the path of the wheel, a top wall extending between said front and rear walls above said wheel, end walls extending between said front and rear walls at points spaced a substantial distance from the ends of the path of said wheel, and means for releasably securing the pivoted section of said front wall to at least one of the other of said walls.

3. In a cut off tool having a base, a cutting wheel mounted for rotation about a horizontal axis disposed above said base, means for rotating said wheel about said axis, means for moving the rotating wheel bodily along a horizontal path at right angles to its axis of rotation, and means for positioning work to be cut on the top of said base in the path of said wheel, the improvement which comprises an elongated wheel guard stationary with respect to said base and completely enclosing the path of said wheel except at the location of the work to be cut, a transverse barrier wall extending upwardly from the base near the work and extending forwardly from said guard, and a window in said barrier wall through which the progress of the cutting operation may be viewed by an operator located behind the barrier wall.

4. In combination with a friction saw having a cutting wheel movable in a horizontal cutting path, the improvement comprising a stationary cutting wheel guard having a pair of spaced vertical side walls, a pair of end walls, and a top wall to enclose the cutting wheel, each of said side walls having an elongated, horizontal slot the length of the cutting stroke of the cutting wheel, said side walls extending substantially beyond the end of the forward stroke of the cutting wheel to form a completely enclosed area remote from the workpiece cutting area to receive any foreign matter which may be discharged from the cutting wheel during the cutting operation.

5. In a friction saw having a work support and a cutting wheel movable in a substantially horizontal path transversely of the work support, the improvement comprising a stationary cutting wheel guard having a pair of spaced vertical side walls on opposite sides of the cutting wheel and end and top walls, each of the side walls having an opening therein in horizontal alignment with the work support for passage of the work therethrough, and a barrier wall extending upwardly beside the work support, said barrier wall extending outwardly from the wheel guard approximately at right angles to the adjacent side wall thereof.

6. In a friction saw having a work support and a cutting wheel movable in a substantially horizontal path transversely of the work support, the improvement comprising a stationary cutting wheel guard having a pair of spaced vertical side walls on opposite sides of the cutting wheel and end and top walls, each of the side walls having an opening therein in horizontal alignment with the work support for passage of the work therethrough, and a barrier wall extending laterally from one of the side walls in a direction opposite from the travel path of the cutting wheel and approximately at right angles to said one side wall.

7. In a friction saw having a work support and a cutting wheel movable in a substantially horizontal path transversely of the work support, the improvement comprising a stationary cutting wheel guard having a pair of spaced vertical side walls on opposite sides of the cutting wheel and end and top walls, each of the side walls having an opening therein in horizontal alignment with the work support for passage of the work therethrough, and a barrier wall extending laterally from one of the side walls in a direction opposite from the travel path of the cutting wheel and approximately at right angles to said one side wall, said barrier wall having a window therein in position for observing the work on the work support.

8. A high-speed rotary friction saw comprising a base having therein a liquid reservoir for holding liquid cooling medium for the friction saw, an upright support mounted upon the base, a saw wheel mounted on the upright support for rotation on a substantially horizontal axis located above the base and for movement back and forth along the base, means for rotating the saw wheel at high speed, a work support mounted at the top of the base with a slot therein for passage of the saw wheel through the slot and through a workpiece mounted on the support during said movements of the saw wheel, means for withdrawing liquid cooling medium from the reservoir and directing said cooling medium onto the surface of said saw wheel during sawing operation without cooling the workpiece, means for directing the liquid cooling medium from said wheel back to the reservoir, and stationary guard means extending upwardly from the base on opposite sides of the path of movement of the saw wheel, said guard means being provided with a transverse opening therethrough at the work support for receiving the workpiece during the cutting operation.

9. A high-speed rotary friction saw comprising a base having therein a liquid reservoir for holding liquid cooling medium for the friction saw, an upright support mounted upon the base, a saw wheel mounted on the upright support for rotation on a substantially horizontal axis located above the base and for movement back and forth along the base, means for rotating the saw wheel at high speed, a work support mounted at the top of the base with a slot therein for passage of the saw wheel through the slot and through a workpiece mounted on the support during said movements of the saw wheel, means for withdrawing liquid cooling medium from the reservoir and directing said cooling medium onto the surface of said saw wheel during sawing operation without cooling the workpiece, means for directing the liquid cooling medium from said wheel back to the reservoir, and stationary guard means extending upwardly from the base on opposite sides of the path of movement of the saw wheel, said guard means being provided with a transverse opening therethrough at the work support for receiving the workpiece during the cutting operation, said guard means having opposite sides extending from the work support in the opposite direction from the friction saw a sufficient distance to cause the cooling medium to be discharged within the guard means between the work support and the outer end of the guard means.

10. A high-speed rotary friction saw comprising a base having therein a liquid reservoir for holding liquid cooling medium for the friction saw, an upright support mounted upon the base, a saw wheel mounted on the upright support for rotation on a substantially horizontal axis located above the base and for movement back and forth along the base, means for rotating the saw wheel at high speed, a work support mounted at the top of the base with a slot therein for passage of the saw wheel through the slot and through a workpiece mounted on the support during said movements of the saw wheel, means for withdrawing liquid cooling medium from the reservoir and directing said cooling medium onto the surface of said saw wheel during sawing operation without cooling the workpiece, and stationary guard means extending upwardly from the base and including side walls spaced on opposite sides of the path of movement of the saw wheel, said side walls having a transverse opening therethrough at the work support for receiving the workpiece during the cutting operation, said side walls extending outwardly from the work support a substantial distance and having a closing end wall spaced appreciably away from the work support forming therebetween an area within the guard means into which the liquid cooling medium is discharged from the saw wheel by centrifugal force during the high speed operation of said wheel, and means for directing the liquid cooling medium from said area in the guard means back to the reservoir.

References Cited in the file of this patent

UNITED STATES PATENTS

| | | |
|---|---|---|
| 992,490 | Fergusson | May 16, 1911 |
| 1,312,121 | Johnson | Aug. 5, 1919 |
| 1,402,923 | Dempsey | Jan. 10, 1922 |
| 1,422,316 | Spiller | July 11, 1922 |
| 1,440,616 | Mikshel | Jan. 2, 1923 |
| 1,446,726 | Sloan | Feb. 27, 1923 |
| 1,735,520 | Williams | Nov. 12, 1929 |
| 1,794,758 | Dittmar | Mar. 3, 1931 |
| 2,089,899 | Kelley | Aug. 10, 1937 |
| 2,322,129 | Hawkins | June 15, 1943 |
| 2,413,016 | Wiken et al. | Dec. 24, 1946 |
| 2,506,610 | Mueller | May 9, 1950 |
| 2,584,209 | Hughart | Feb. 5, 1952 |

FOREIGN PATENTS

| | | |
|---|---|---|
| 459,241 | Germany | Apr. 30, 1928 |
| 334,406 | Switzerland | Jan. 15, 1959 |